F. LOEDIGE.
JOURNAL LUBRICATOR.
APPLICATION FILED FEB. 24, 1913.
1,126,044.
Patented Jan. 26, 1915.
2 SHEETS—SHEET 2.
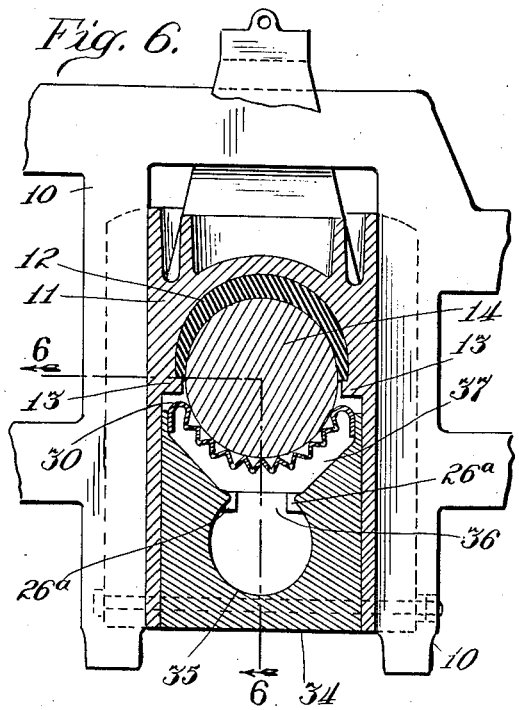
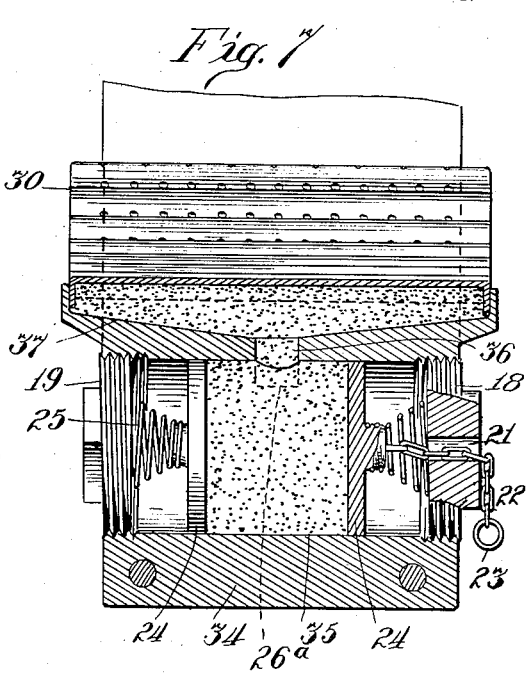
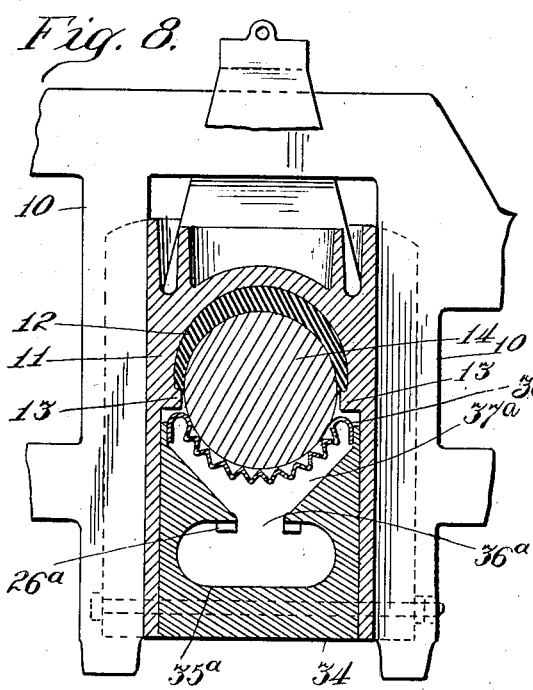
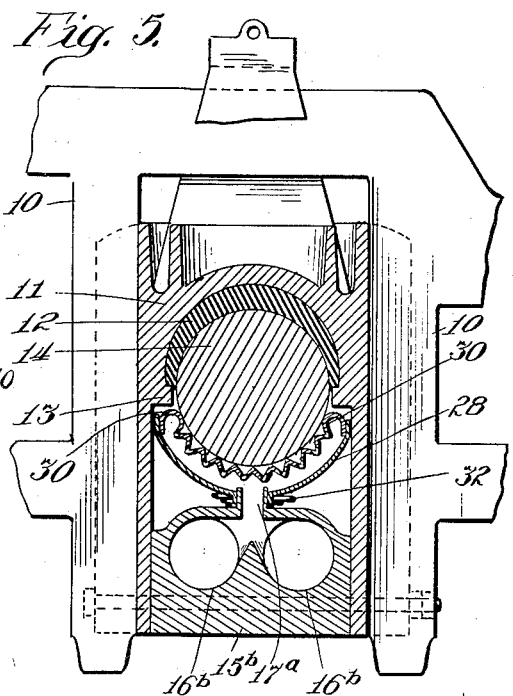
Witnesses:
Milton Lenoir
R. E. Wighton
Inventor:
Frederick Loedige,
By Heideman Street
Attorneys.

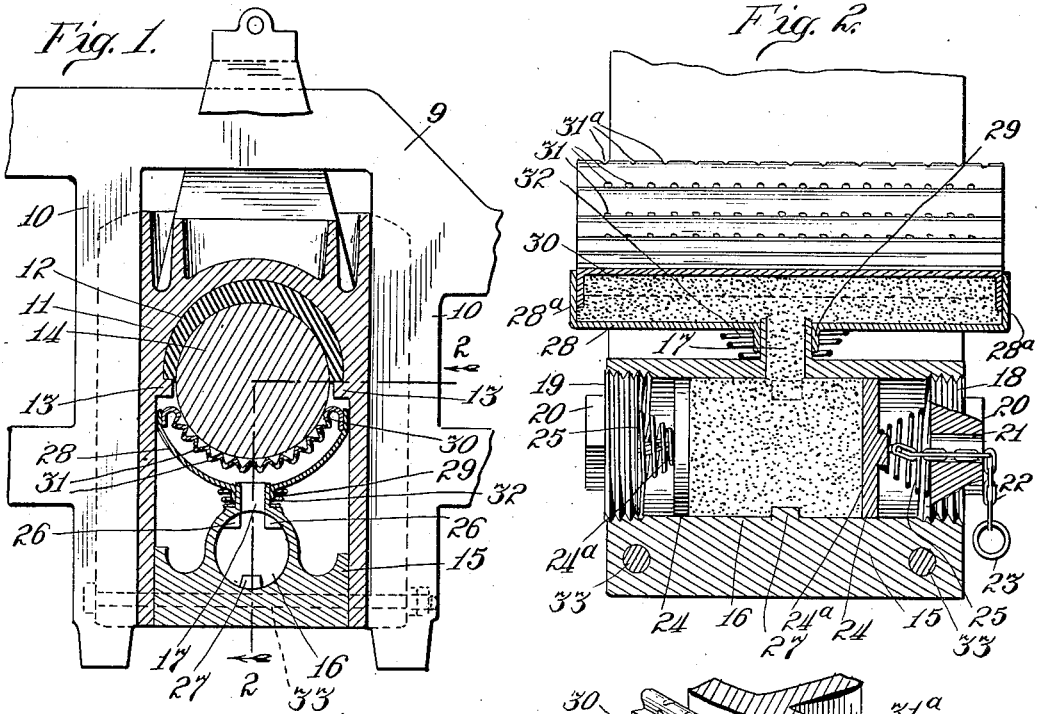

UNITED STATES PATENT OFFICE.

FREDERICK LOEDIGE, OF CHICAGO, ILLINOIS.

JOURNAL-LUBRICATOR.

1,126,044. Specification of Letters Patent. Patented Jan. 26, 1915.

Application filed February 24, 1913. Serial No. 750,252.

*To all whom it may concern:*

Be it known that I, FREDERICK LOEDIGE, a citizen of the United States, and resident of Chicago, in the county of Cook and State of Illinois, have invented certain new and useful Improvements in Journal-Lubricators, of which the following is a description, reference being had to the accompanying drawings, which form a part of my specification.

My invention relates to means adapted to be located in the journal bearings, whereby a constant lubrication of the journal may be obtained.

The invention is more especially adapted for use in connection with the bearings of railway car axles or journals and the axles of locomotives; having for its object the provision of means whereby such bearings or journals may be automatically and constantly lubricated through the application of a lubricant of more or less solid consistency, and thereby eliminate the use of oiled waste and the like, as well as a liquid lubricant, as heretofore employed in railway practice.

The purpose of my invention is to provide a construction wherein the lubricant applying means will be yieldingly maintained in close relation with the axle or journal to be lubricated; and wherein ready access may be had to the lubricant-containing chambers or holders without the necessity of employing special appliances or tools for the removal of parts.

A further object of the invention is to provide a device wherein the lubricant will be maintained under constant pressure, without the necessity, however, of subjecting the pressure-applying mechanism to any undue strain or weight except the weight or force resulting from the lubricant itself.

A further object of the invention is to provide a device which can be readily recharged with lubricant without the necessity of removing the device from the journal box or bearing; a device whereby the supply of lubricant within will be readily indicated, and wherein the possibility for leakage of the lubricant is substantially entirely eliminated.

Another object of the invention is the provision of a device having as few parts as possible, thus eliminating the possibilities of breakage and disarrangement and materially affecting the cost of manufacture and maintenance, and which may be readily removed when desired, as will more fully be understood from the following detailed description.

In the drawings:—Figure 1 is a vertical sectional view taken transversely of a journal box or bearing, shown inserted between the pedestal columns of a locomotive frame, with my improved device shown in place. Fig. 2 is a longitudinal sectional view taken on the irregular line 2—2 of Fig. 1, looking in the direction of the arrows, illustrating my device on an enlarged scale. Fig. 3 is a perspective view of my improved device looking downward on the same from one of the ends thereof. Fig. 4 is a vertical sectional view, taken transversely of the journal and bearing, of a modified form of my invention shown applied to a journal box. Fig. 5 is a vertical sectional view, taken transversely of the journal and bearing, illustrating a modified form of my invention. Fig. 6 is a vertical sectional view, taken transversely of the journal and bearing, illustrating another modification of my invention. Fig. 7 is a longitudinal sectional view taken on the irregular line 6—6 of Fig. 6, showing the construction on an enlarged scale. Fig. 8 is a vertical sectional view taken transversely of the journal and bearing, illustrating still another modified form of my invention.

In the exemplification of my invention, I have shown the same applied to the journal box of a locomotive, but it will be understood that the invention is equally adapted for use in connection with any journal bearing, whether applied to the driver of a locomotive or to journal-bearings of a railway car and the like; the invention permitting of its use in connection with any form of journal box or bearing.

Referring to the form of my invention as illustrated in the first three figures of the drawings, 9 illustrates a portion of a locomotive frame, which is located inside of the drive wheel; the frame having the usual pedestal columns 10, 10, between which the journal-box or bearing 11 is slidably mounted. The journal-box or bearing 11 is provided with the usual journal brass or bearing 12, which is shown maintained in proper position by the inwardly presented shoulders or lugs 13, so constructed, however, as not to come into contact with the journal or axle 14. By reason of the form and construction of my invention, the bearing or box 11 need not be provided with the usual bottom or cellar, but may be left open as illustrated in the drawings, thus resulting in a very much cheaper and lighter construction.

My invention comprises a box or member 15, which may be of cast metal and provided with a chamber or compartment 16 adapted to receive a solid mass of lubricating material. In the construction illustrated in Fig. 1, the chamber 16 is shown cylindrical, and provided with the central, upwardly discharging, spout or opening 17. The ends of the chamber 16 of member 15 are preferably internally threaded, as more clearly shown in Fig. 2, to receive the screw caps or covers 18 and 19; the caps or covers being preferably provided with a small engaging surface on the outer side as shown at 20, whereby the caps may be screwed into and out of the ends of chamber 16. The cap or cover secured in the end of chamber 16, farthest removed from the hub of the wheel, is preferably provided with a central opening therethrough as indicated at 21, see Figs. 2 and 3, of a size sufficient to permit of the free movement of a cord or chain 22, the other end of which is shown provided with an enlarged link or ring 23 whereby the cord or chain 22 will be prevented from moving or being drawn entirely within chamber 16.

Slidably mounted within chamber 16, and preferably arranged at opposite ends of the chamber, are the plungers 24, 24, whose position and movement is controlled by the springs 25, 25, which are preferably shown in the nature of helical springs, with their base portion preferably secured to caps or covers 18 and 19 respectively, while the opposite or smaller ends are shown encircling boss 24ª on the side of plungers 24 adjacent thereto. By employing helical springs as shown, it is evident that the springs may be entirely collapsed and the plungers 24, 24, brought into close proximity to the caps or covers 18 and 19, at the ends of the chamber. The length of springs 25 is such that they will tend to force plungers or followers 24, 24, inwardly and into close proximity to the vertical center of the chamber, that is in proximity to the upwardly discharging orifice or spout 17. In order, however, that the plungers 24 may not be forced immediately beneath the spout or discharging orifice 17, and thus allow the possibility of lubricant held in the spout 17 to fall or flow to the opposite or spring sides of the plungers, I show the chamber 16 provided with shoulders or lugs 26 and 27, so arranged that when plungers or followers 24 are abutting against these lugs or shoulders, the plungers will still maintain proper vertical positions.

Loosely mounted above member or holder 15 is a semi-cylindrical pan or shallow trough 28, shown provided with an opening in its bottom adapted to receive the upwardly presented spout or discharge 17 of holder 15. I prefer to provide the bottom of pan or trough 28 with the downwardly presented flanges 29 adapted to slide over and engage with the upwardly presented spout 17, thus allowing of more or less vertical movement between pan 28 and holder 15. The pan or member 28 is provided with the upturned edges as shown at 28ª, so as to prevent the leakage of lubricant and also to provide means for receiving the downwardly bent edges of the concavo-convex plate 30, which latter is intended to engage with the under surface of the journal or axle to be lubricated.

The plate 30, in its preferred form is corrugated longitudinally, as clearly shown in Figs. 1 and 3, thus providing longitudinally extending valleys and ridges; the latter being in constant engagement with the under side of the journal 14, as clearly shown in Fig. 1, while the valleys or V-shape chambers intermediate of the ridges are provided with lines of perforations as shown at 31, thus affording communication with the interior of the pan or trough 28 and allowing the lubricant in pan or trough 28 to flow into the valleys or V-shape chambers of the plate 30. I also prefer to provide the longitudinal sides of the plate 30 with a series of transversely extending grooves 31ª, more clearly seen in Fig. 3, which may be termed leakage grooves. These grooves also become filled with the lubricant either through the wiping or suction action of the rapidly revolving journal, and afford a greater surface of lubricant to be presented to the journal; and by providing an interrupted metallic edge on the sides of the plate against the journal, it is apparent that additional cooling means for the journal is thus obtained. The plate 30 is preferably loosely seated in pan or trough 28, as clearly shown, with the downwardly bent edges telescoping the upwardly presented sides of the trough or member 28, so that ready access may be had to the various portions of my improved device to enable the cleaning thereof and replacing of worn or broken parts. It is understood, of course, that the ends of the trough or member 28 are dished or concaved so as to permit the trough or member 28 to be brought into juxtaposition with the journal.

In order to maintain the cover plate 30 in constant contact with the journal and at the same time permitting of a yielding relation, when desired, between trough or member 28 and holder 15, I provide one or more springs as at 32, which are preferably arranged encircling the spout connection between member 15 and trough or member 28, as clearly shown in Figs. 1 and 2. The spring 32 is preferably shown in the nature of a helical spring so as to permit of its complete compression when necessary. While my improved lubricating device is intended to move with the journal bearing, being removably maintained in place by sustaining bolts 33, 33 arranged to extend through suitable openings or lugs in the sides of the bearing and the base of member or holder 15, I prefer that the yielding connection between members 15 and 28 be employed, so as to compensate for the constant vibration to which the journal is subjected.

The inner end of chain 22 is fixedly secured to the side of the adjacent plunger 24, and not only constitutes means whereby the position of the plungers within the chamber 16 will be indicated, but also affords means whereby the plunger in the side of the chamber farthest removed from the hub of the wheel may be withdrawn from the chamber, after the adjacent cap or cover has been removed, so as to permit of the recharging of chamber 16 with a fresh supply of lubricant.

In Fig. 4, I illustrate a modified form of my invention, wherein the holder 15$^a$ is shown provided with two chambers 16$^a$, 16$^a$, preferably cylindrical in form, so as to permit of the use of circular plungers or followers, as shown in Fig. 2 at 24. In this construction, I provide the upwardly extending spouts or discharge openings 17$^a$, 17$^a$, leading from both chambers 16$^a$; and therefore also provide the dish or trough 28$^b$ with two openings, on opposite sides of the longitudinal center thereof, adapted to receive the spouts 17$^a$, which are preferably located at the vertical centers of the chambers of holder or member 15$^a$. The construction of dish or trough 28$^b$ and plate 31 in every other respect is identical with that previously described. In this instance, I prefer to employ a spring 32$^a$ secured about each upwardly presented spout 17$^a$, so as to provide a yielding relation between the member 28$^b$ and member 15$^a$ to maintain plate 31 in constant engagement with the journal 14. In this construction, the member 15$^a$ is secured in the bottom of the bearing or journal-box by the bolts 33 in a maner similar to that previously described.

In the modification shown in Fig. 5, the holder or member 15$^b$ is also provided with two cylindrical chambers 16$^b$, 16$^b$, which communicate with a single, centrally located, spout or discharge orifice 17$^b$, which latter has sliding engagement with the member or trough 28 similar to that shown in Fig. 1; the spring 32 maintaining a yielding connection between the pan or trough 28 and member 15$^b$.

In Figs. 6, 7, and 8, the lubricant holder comprises a single casting or member 34 having a lubricant holding chamber 35, shown cylindrical in form in Figs. 6 and 7 and oblong in cross section at 35$^a$ in Fig. 8. The chambers 35 and 35$^a$ of the constructions shown in Figs. 6 and 8 are each provided with an opening, preferably located at the vertical center of the chamber, as shown at 36 in Fig. 6, and 36$^a$ in Fig. 8, whereby communication is afforded with the shallow trough 37 in Fig. 6 and 37$^a$ in Fig. 8. The side and end walls of holder 34 are intended to extend upward beyond the trough 37, in Fig. 6, and 37$^a$ in Fig. 8, so as to prevent leakage of lubricant from the shallow trough and also to receive the depending edges of the plate or cover 30.

The construction shown in Figs. 6 and 7 is provided with the annular plungers or followers 24, 24, controlled by the springs 25, with the ends of the chamber 35 inclosed by caps or covers 18 and 19, all similar to that shown in Fig. 2 and heretofore described. In the construction illustrated in Fig. 8, however, the spring controlled plungers or follower members are of a configuration conforming to the cross sectional configuration of the chamber 35$^a$; and the caps or covers which close the ends of chamber 35$^a$ may be secured or maintained in place by other means than the screw-threads employed in connection with the constructions shown in the preceding figures where circular covers or caps are employed.

Adjacent to the discharge openings 36, 36$^a$, I show the holders provided with the shoulders or lugs 26$^a$, whereby the too far inward movement of the plungers or followers is prevented.

By reason of the nature of my improved device, it is evident that the journal bearing need not be provided with the usual cellar heretofore employed, because the lubricant holder, which is secured to the depending sides of the bearing by suitable bolts as described, will afford sufficient support to the bearing sides and prevent any possibility of warping.

In the employment of my invention, the device is secured within the depending ends of the bearing by means of suitable bolts as described, so as to bring the journal engaging plate 30 into engagement with the under surface of the journal; the cover or cap at the end of the holder farthest removed from the hub of the wheel is then removed and the adjacent plunger or follower 24 withdrawn from the chamber or chambers within the holder; a properly formed cake or mass of solid lubricant, of sufficient quantity, is then inserted into the chamber or chambers of the device by forcing or pressing the plunger at the opposite or closed end of the holder against the action of its spring, and into proximity to the cover or cap at said end. With the lubricant forced into the holder, the previously removed plunger or follower 24 is replaced within the chamber or chambers and the cap or cover secured in place.

It is apparent that the cake of lubricant intermediate of the plungers will be subjected to considerable pressure from both sides or ends, and as the plungers are adapted to fit snugly within the chamber, the lubricant will be constantly forced through the upwardly presented opening or openings at the vertical center or centers of the chamber or chambers and into the shallow trough or pan located above the chamber or chambers and intermediate of the main body or portion of the holder or device and the journal engaging plate 30. The lubricant being under constant pressure will tend to pass through the perforations 31 in the plate 30 and enter the longitudinally extending valleys in the upper surface of the plate, where it will come into contact with the revolving journal or axle; the slight heating due to frictional engagement resulting in a more or less softening of the lubricant will tend toward a freer flow thereof.

It is apparent from the constructions shown and described, that the lubricant will be constantly protected, so that it will be practically impossible for any dust or dirt to come into contact with the lubricant and the bearing surface of the journal.

I have shown and described what I believe to be the simplest and best forms of my invention, but the same may be modified in certain respects without, however, departing from the spirit of my invention, and I do not wish to be understood as limiting myself to the precise constructions shown and described.

What I claim is:—

1. A journal lubricator, comprising a holder provided with one or more lubricant-holding chambers extending lengthwise thereof, a lubricant-receiving trough located above the chamber or chambers and in communication with the latter at a point substantially at the longitudinal center thereof, a concavo-convex foraminated cover or plate mounted in said trough, means movable lengthwise of the chamber or chambers whereby the lubricant is forced toward the point of communication between the chamber or chambers and the trough, and means for preventing movement of said movable means beyond a predetermined point.

2. A journal lubricator, comprising a holder provided with one or more lubricant-holding chambers, a lubricant-receiving trough loosely mounted above said holder and in communication with said chamber or chambers, means whereby the trough will be yieldingly maintained in close relation with the journal, means whereby the lubricant will be forced from said chamber or chambers and into said trough, and means for limiting movement of said lubricant-forcing means beyond the point of communication between said trough and said chamber or chambers.

3. A journal lubricator, comprising a holder provided with one or more lubricant-holding chambers, a lubricant-receiving trough loosely mounted on said holder and having communication with said chamber or chambers of the holders, means whereby the trough is yieldingly maintained in close relation with the journal, a perforated plate or cover for said trough, and means arranged within said chamber or chambers whereby the lubricant is forced into said trough.

4. A journal lubricator, comprising a holder provided with one or more lubricant-holding chambers and a lubricant-receiving trough above said chamber or chambers and in communication therewith, oppositely movable means whereby constant pressure is exerted from opposite ends of said chamber or chambers toward the point of communication with said trough, and means extending through to the outside of the holder and having controlling relation with a portion of said first mentioned means whereby the position of the latter may be determined and controlled.

5. A journal lubricator, comprising a holder provided with one or more lubricant-holding chambers having an upwardly presented spout or discharge, a lubricant-receiving trough located above said holder and arranged to receive said spout or discharge from the chamber or chambers, a foraminated top or cover for said trough arranged to engage and conforming with the under surface of the journal, spring controlled plungers arranged at opposite ends in said chamber or chambers and between which the lubricant mass is located whereby constant pressure on the lubricant will be exerted and the same forced through said spout or discharge and into the trough.

6. A journal lubricator, comprising a holder adapted to be removably secured in the journal-bearing beneath the journal, said holder being provided with a lubricant-holding chamber or chambers extending longitudinally throughout the lower part of the holder and a dished surface or trough extending lengthwise throughout the holder and above the plane occupied by said chamber or chambers and in communication therewith, said chamber or chambers being provided with oppositely disposed spring-controlled sides adapted to move lengthwise of the holder whereby the lubricant is confined and forced into said dished surface or trough.

7. A journal lubricator, comprising a holder adapted to be removably secured in the journal-bearing beneath the journal, said holder being provided with a lubricant-holding chamber or chambers having removable ends and a dished surface or trough above the chamber or chambers, one or more centrally located ports leading from said chamber or chambers to said dished surface or trough, means arranged on opposite sides of said ports and within the chamber or chambers, and springs intermediate of said means and said ends whereby the means are forced toward the ports and the lubricant is forced through said ports and into said dished surface or trough.

8. A journal lubricator, comprising a holder provided with one or more lubricant-holding chambers extending lengthwise throughout the lower or body-portion thereof and a dished surface or trough extending lengthwise throughout the upper part of the holder and in a plane above said chamber or chambers, said trough having communication with the chamber or chambers at a point intermediate of the ends thereof, and spring actuated means arranged in opposite ends of the said chamber or chambers and movable horizontally toward the center thereof whereby the lubricant will be forced into said trough.

9. A journal lubricator, comprising a holder provided with a lubricant-holding chamber extending longitudinally throughout the lower part of the holder, and a lubricant-receiving trough extending lengthwise of the holder and above the chamber thereof, said trough having communication with the chamber at a point intermediate of the ends thereof, a longitudinally corrugated cover or plate for said trough provided with openings at prearranged points and with transversely extending grooves along the longitudinal edges thereof, and spring-controlled means adapted to move lengthwise of the chamber from opposite ends thereof whereby the lubricant is forced from the chambers upward into said trough.

FREDERICK LOEDIGE.

Witnesses:
N. A. STREET,
R. E. WIGHTON.